(12) United States Patent
Kucera et al.

(10) Patent No.: US 12,683,722 B2
(45) Date of Patent: Jul. 14, 2026

(54) RELIABLE GROUPCASTING IN WIRELESS COMMUNICATION NETWORKS

(71) Applicant: Nokia Technologies Oy, Espoo (FI)

(72) Inventors: Stepan Kucera, Munich (DE); Berthold Panzner, Munich (DE)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 18/547,821

(22) PCT Filed: Feb. 11, 2022

(86) PCT No.: PCT/EP2022/053310
§ 371 (c)(1),
(2) Date: Aug. 24, 2023

(87) PCT Pub. No.: WO2022/228743
PCT Pub. Date: Nov. 3, 2022

(65) Prior Publication Data
US 2024/0137162 A1    Apr. 25, 2024
US 2024/0235746 A9    Jul. 11, 2024

(30) Foreign Application Priority Data

Apr. 29, 2021    (FI) ..................................... 20215501

(51) Int. Cl.
*H04L 1/1829*    (2023.01)
*H04L 1/00*    (2006.01)
(52) U.S. Cl.
CPC .... *H04L 1/1854* (2013.01); *H04L 2001/0093* (2013.01)
(58) Field of Classification Search
CPC ................. H04L 1/1848; H04L 1/1854; H04L 2001/0093
See application file for complete search history.

(56) References Cited

U.S. PATENT DOCUMENTS

2020/0260231 A1    8/2020  Ganesan et al.
2020/0267597 A1*   8/2020  Huang .................. H04L 1/1812
(Continued)

FOREIGN PATENT DOCUMENTS

EP          2340629 A1    7/2011
WO    2010/034339 A1    4/2010
(Continued)

OTHER PUBLICATIONS

"Msc-generator", Sourceforge, Retrieved on Sep. 11, 2023, Webpage available at : https://sourceforge.net/projects/msc-generator/.
(Continued)

*Primary Examiner* — Mansour Oveissi
(74) *Attorney, Agent, or Firm* — Barta Jones, PLLC

(57) ABSTRACT

According to an example aspect of the present invention, there is provided an apparatus comprising means for receiving, by a first wireless terminal, a first retransmission of a groupcast message successfully from a second wireless terminal, means for skipping, by the first wireless terminal, a transmission of feedback related to reception of the first retransmission at the first wireless terminal, means for monitoring, by the first wireless terminal, feedback from a third wireless terminal, wherein said feedback is related to reception of the first retransmission at the third wireless terminal and means for transmitting, by the first wireless terminal, derived feedback related to reception of the first retransmission at the third wireless terminal to the second wireless terminal.

8 Claims, 5 Drawing Sheets

(56) References Cited

U.S. PATENT DOCUMENTS

| | | |
|---|---|---|
| 2020/0351032 A1 | 11/2020 | Wu et al. |
| 2021/0021536 A1 | 1/2021 | Ganesan et al. |
| 2023/0155734 A1* | 5/2023 | Keränen .......... H04W 52/0219 |
| | | 370/328 |

FOREIGN PATENT DOCUMENTS

| | | |
|---|---|---|
| WO | 2019/029652 A1 | 2/2019 |
| WO | 2020/033622 A1 | 2/2020 |
| WO | 2020/062096 A1 | 4/2020 |
| WO | 2020/064304 A1 | 4/2020 |
| WO | 2020/093327 A1 | 5/2020 |
| WO | 2020/125990 A1 | 6/2020 |
| WO | 2021/008706 A1 | 1/2021 |
| WO | 2021/030697 A1 | 2/2021 |

OTHER PUBLICATIONS

"Discussion on Sidelink groupcast HARQ", 3GPP TSG-RAN WG1 Meeting #96bis, R1-1905340, Agenda: 7.2.4.8, Nokia, Apr. 8-12, 2019, 9 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.5.0, Mar. 2021, pp. 1-391.

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

Office action received for corresponding Finnish Patent Application No. 20215501, dated Oct. 15, 2021, 11 pages.

"3rd Generation Partnership Project; Technical Specification Group Services and System Aspects; Study on system enhancement for Proximity based Services (ProSe) in the 5G System (5GS) (Release 17)", 3GPP TR 23.752, V17.0.0, Mar. 2021, pp. 1-183.

International Search Report and Written Opinion received for corresponding Patent Cooperation Treaty Application No. PCT/EP2022/053310, dated Jun. 15, 2022, 14 pages.

"On Physical Layer Procedures for NR V2X Sidelink", 3GPP TSG RAN WG1 #96bis, R1-1905405, Agenda: 7.2.4.5, InterDigital Inc, Apr. 8-12, 2019, 9 pages.

* cited by examiner

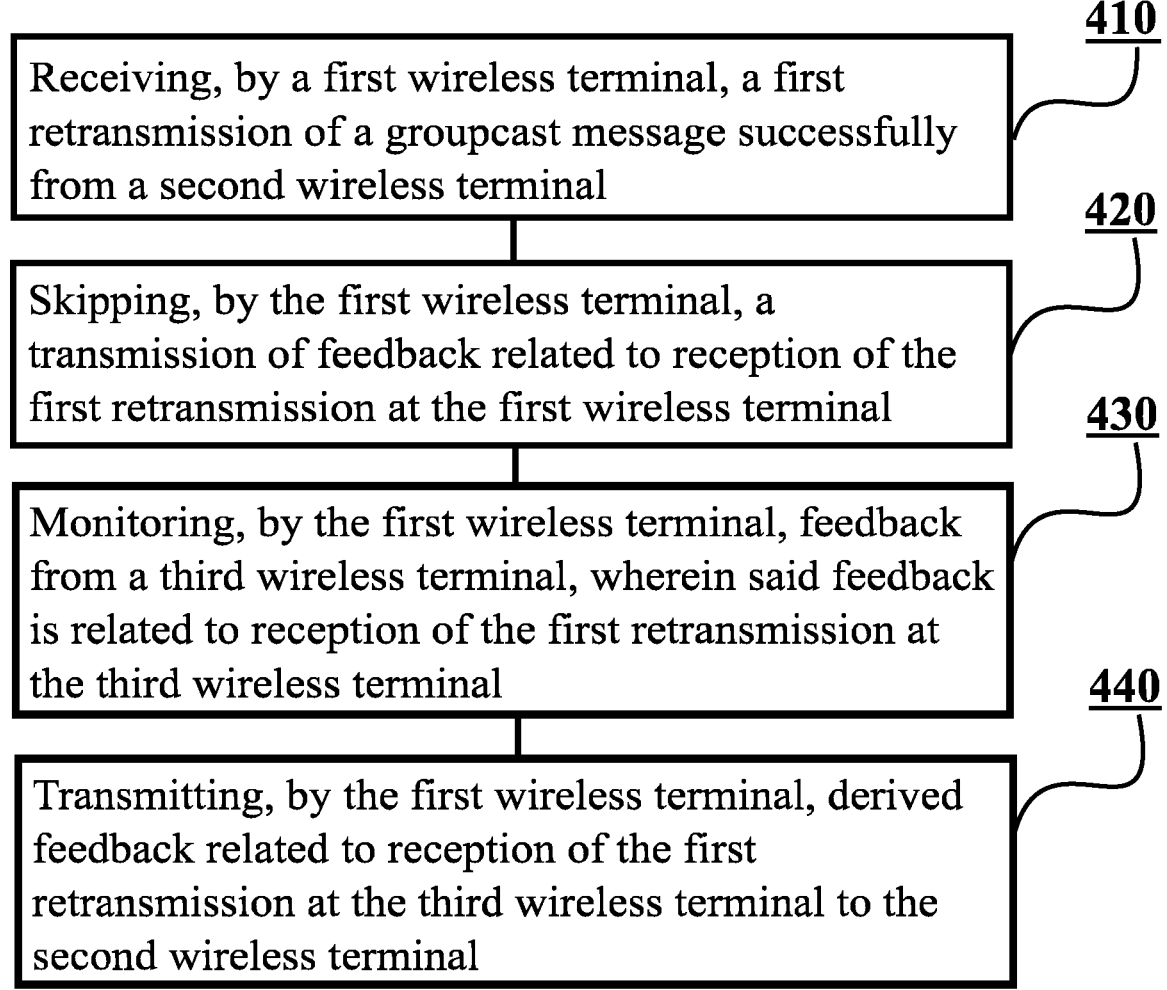

410

Receiving, by a first wireless terminal, a first retransmission of a groupcast message successfully from a second wireless terminal

420

Skipping, by the first wireless terminal, a transmission of feedback related to reception of the first retransmission at the first wireless terminal

430

Monitoring, by the first wireless terminal, feedback from a third wireless terminal, wherein said feedback is related to reception of the first retransmission at the third wireless terminal

440

Transmitting, by the first wireless terminal, derived feedback related to reception of the first retransmission at the third wireless terminal to the second wireless terminal

FIGURE 4

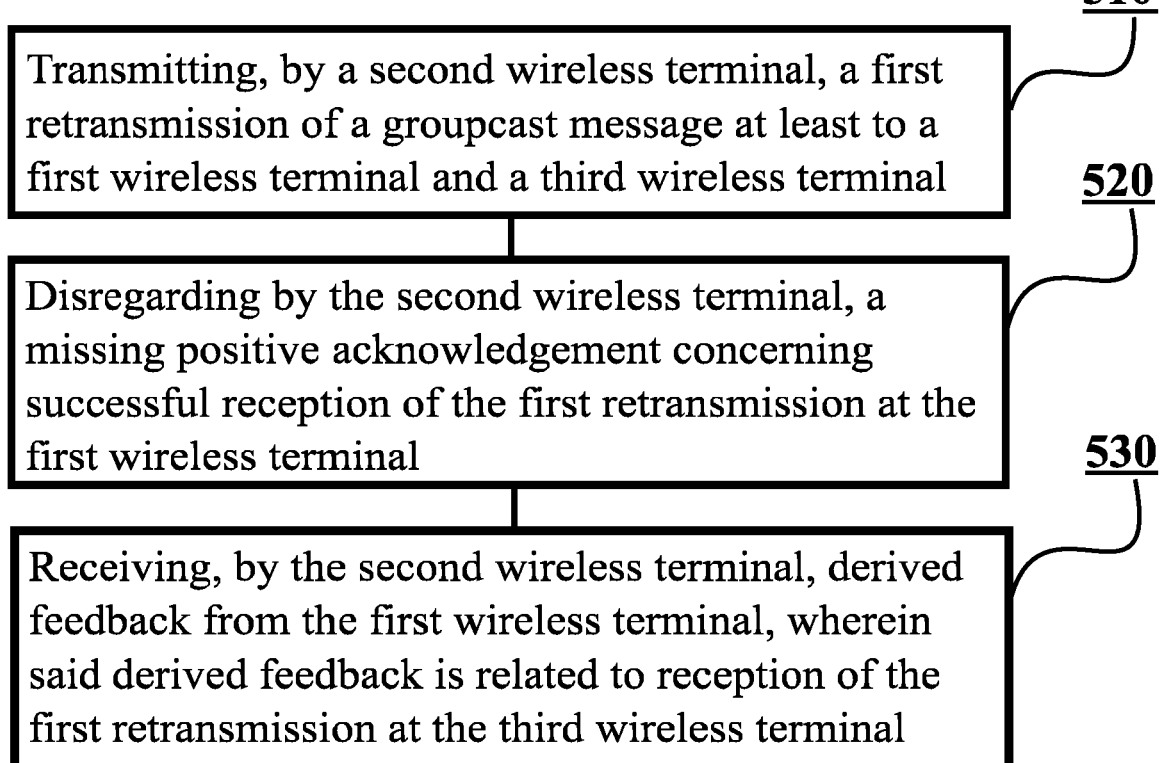

510
Transmitting, by a second wireless terminal, a first retransmission of a groupcast message at least to a first wireless terminal and a third wireless terminal

520
Disregarding by the second wireless terminal, a missing positive acknowledgement concerning successful reception of the first retransmission at the first wireless terminal

530
Receiving, by the second wireless terminal, derived feedback from the first wireless terminal, wherein said derived feedback is related to reception of the first retransmission at the third wireless terminal

FIGURE 5

RELIABLE GROUPCASTING IN WIRELESS COMMUNICATION NETWORKS

RELATED APPLICATION

This application was originally filed as a Patent Cooperation Treaty Application No. PCT/EP2022/053310 filed on Feb. 11, 2022, which claims priority of a FI national application Ser. No. 20/215,501 filed on Apr. 29, 2021, both of which are hereby incorporated in their entirety.

FIELD

Various example embodiments relate in general to wireless communication networks and more specifically, to groupcasting in such networks.

BACKGROUND

Groupcasting in wireless communication networks refers to transmitting messages to a group of wireless terminals. That is, at least one groupcast message may be transmitted to at least two receivers of a group. Groupcasting may be exploited in cellular communication networks, such as in networks standardized by the 3rd generation partnership project, 3GPP. For instance, groupcasting may be used in cellular communication networks operating according to 5G radio access technology which is currently being standardized by the 3GPP. 5G radio access technology may also be referred to as New Radio, NR, access technology. Groupcasting may naturally be exploited in other cellular communication networks and in non-cellular communication networks as well, such as in Wireless Local Area Networks, WLANs. In general, there is a need to provide improved methods, apparatuses and computer programs which enable reliable groupcasting in wireless communication networks.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided an apparatus, comprising means for receiving, by a first wireless terminal, a first retransmission of a groupcast message successfully from a second wireless terminal, means for skipping, by the first wireless terminal, a transmission of feedback related to reception of the first retransmission at the first wireless terminal, means for monitoring, by the first wireless terminal, feedback from a third wireless terminal, wherein said feedback is related to reception of the first retransmission at the third wireless terminal and means for transmitting, by the first wireless terminal, derived feedback related to reception of the first retransmission at the third wireless terminal to the second wireless terminal. The apparatus of the first aspect may comprise the first wireless terminal, or a control device configured to control the functioning thereof, possibly when installed therein.

Example embodiments of the first aspect may comprise at least one feature from the following bulleted list or any combination of the following features:

wherein said means for means for skipping a transmission of feedback related to reception of the first retransmission at the first wireless terminal further comprises means for refraining from acknowledging successful reception of the first retransmission;

wherein said derived feedback is unsolicited feedback related to said monitoring;

means for detecting, based on said monitoring, that the third wireless terminal did not receive successfully the first retransmission of the groupcast message and means for transmitting, by the first wireless terminal, upon said detection, a second retransmission of the groupcast message to a third terminal;

means for receiving an indication from the second wireless terminal, wherein the indication indicates a fully transparent mode, the fully transparent mode being a mode wherein an identity of the second wireless terminal is to be used in the second retransmission instead of an identity of the first wireless terminal;

means for transmitting the second retransmission jointly with the second wireless terminal;

means for receiving a groupcast retransmission delegation request, wherein the groupcast retransmission delegation request is a request, by the second wireless terminal for the first wireless terminal, for retransmitting the groupcast message and means for retransmitting the groupcast message upon receiving the groupcast retransmission delegation request;

wherein the groupcast retransmission delegation request comprises a timer and the apparatus further comprises means for storing said data of the groupcast message to a memory of the apparatus until the timer expires.

According to a second aspect of the present invention, there is provided an apparatus, comprising means for transmitting, by a second wireless terminal, a first retransmission of a groupcast message at least to a first wireless terminal and a third wireless terminal, means for disregarding by the second wireless terminal, a missing positive acknowledgement concerning successful reception of the first retransmission at the first wireless terminal and means for receiving, by the second wireless terminal, derived feedback from the first wireless terminal, wherein said derived feedback is related to reception of the first retransmission at the third wireless terminal. The apparatus may comprise the second wireless terminal, or a control device configured to control the functioning thereof, possibly when installed therein.

Example embodiments of the second aspect may comprise at least one feature from the following bulleted list or any combination of the following features:

wherein said derived feedback is unsolicited feedback related to monitoring said feedback;

means for transmitting an indication to the first wireless terminal, wherein the indication indicates a fully transparent mode, the fully transparent mode being a mode wherein an identity of the second wireless terminal is to be used in a second retransmission by the first wireless terminal instead of an identity of the first wireless terminal;

means for transmitting the second retransmission jointly with the first wireless terminal.

According to a third aspect of the present invention, there is provided a first method, comprising receiving, by a first wireless terminal, a first retransmission of a groupcast message successfully from a second wireless terminal, skipping, by the first wireless terminal, a transmission of feedback related to reception of the first retransmission at the first wireless terminal, monitoring, by the first wireless terminal, feedback from a third wireless terminal, wherein said feedback is related to reception of the first retransmission at the third wireless terminal and transmitting, by the first wireless terminal, derived feedback related to reception of the first retransmission at the third wireless terminal to the second wireless terminal. The first method may be performed by the first wireless terminal, or a control device configured to control the functioning thereof, possibly when installed therein.

According to a fourth aspect of the present invention, there is provided a second method, comprising transmitting, by a second wireless terminal, a first retransmission of a groupcast message at least to a first wireless terminal and a third wireless terminal, disregarding by the second wireless terminal, a missing positive acknowledgement concerning successful reception of the first retransmission at the first wireless terminal and receiving, by the second wireless terminal, derived feedback from the first wireless terminal, wherein said derived feedback is related to reception of the first retransmission at the third wireless terminal. The second method may be performed by the second wireless terminal, or a control device configured to control the functioning thereof, possibly when installed therein.

According to a fifth aspect of the present invention, there is provided an apparatus comprising at least one processing core, at least one memory including computer program code, the at least one memory and the computer program code being configured to, with the at least one processing core, cause the apparatus at least to receive, by a first wireless terminal, a first retransmission of a groupcast message successfully from a second wireless terminal, skip, by the first wireless terminal, a transmission of feedback related to reception of the first retransmission at the first wireless terminal, monitor, by the first wireless terminal, feedback from a third wireless terminal, wherein said feedback is related to reception of the first retransmission at the third wireless terminal and transmit, by the first wireless terminal, derived feedback related to reception of the first retransmission at the third wireless terminal to the second wireless terminal. The apparatus may comprise the first wireless terminal, or a control device configured to control the functioning thereof, possibly when installed therein.

According to a sixth aspect of the present invention, there is provided an apparatus comprising at least one processing core, at least one memory including computer program code, the at least one memory and the computer program code being configured to, with the at least one processing core, cause the apparatus at least to transmit, by a second wireless terminal, a first retransmission of a groupcast message at least to a first wireless terminal and a third wireless terminal, disregard by the second wireless terminal, a missing positive acknowledgement concerning successful reception of the first retransmission at the first wireless terminal and receive, by the second wireless terminal, derived feedback from the first wireless terminal, wherein said derived feedback is related to reception of the first retransmission at the third wireless terminal. The apparatus may comprise the second wireless terminal, or a control device configured to control the functioning thereof, possibly when installed therein.

According to a seventh aspect of the present invention, there is provided a non-transitory computer readable medium having stored thereon a set of computer readable instructions that, when executed by at least one processor, cause an apparatus to at least perform the first or the second method. According to an eighth aspect of the present invention, there is provided a computer program comprising instructions which, when the program is executed by an apparatus, cause the apparatus to carry out the first or the second method.

BRIEF DESCRIPTION OF THE DRAWINGS

FIG. 4 illustrates a flow graph of a first method in accordance with at least some example embodiments; and FIG. 5 illustrates a flow graph of a second method in accordance with at least some example embodiments.

EXAMPLE EMBODIMENTS

Embodiments of the present invention provide enhancements for groupcasting in cellular communication networks. More specifically, embodiments of the present invention make it possible for a first wireless terminal to receive a retransmission of a groupcast message successfully from a second wireless terminal, but if the first wireless terminal has already acknowledged successful reception of the groupcast message, the first wireless terminal may skip a transmission of feedback, wherein said feedback would be related to reception of the retransmission at the first wireless terminal, such as a positive acknowledgement. Instead of transmitting said feedback, the first wireless terminal may monitor feedback related to reception of the retransmission at a third wireless terminal and transmit derived feedback associated with reception of the retransmission at the third wireless terminal to the second wireless terminal. Said derived feedback related to reception of the retransmission at the third wireless terminal may be derived from said feedback, i.e., said derived feedback may be the same as said feedback, or said derived feedback may be different and comprise for example additional meta-data.

Hence, reliability may be improved, because the first wireless terminal waits for said feedback associated with reception of the retransmission at the third wireless before acknowledging the retransmission. The second wireless terminal is aware that the first wireless terminal performs said monitoring, because the first wireless terminal has already acknowledged reception of the groupcast message.

Figure 1:
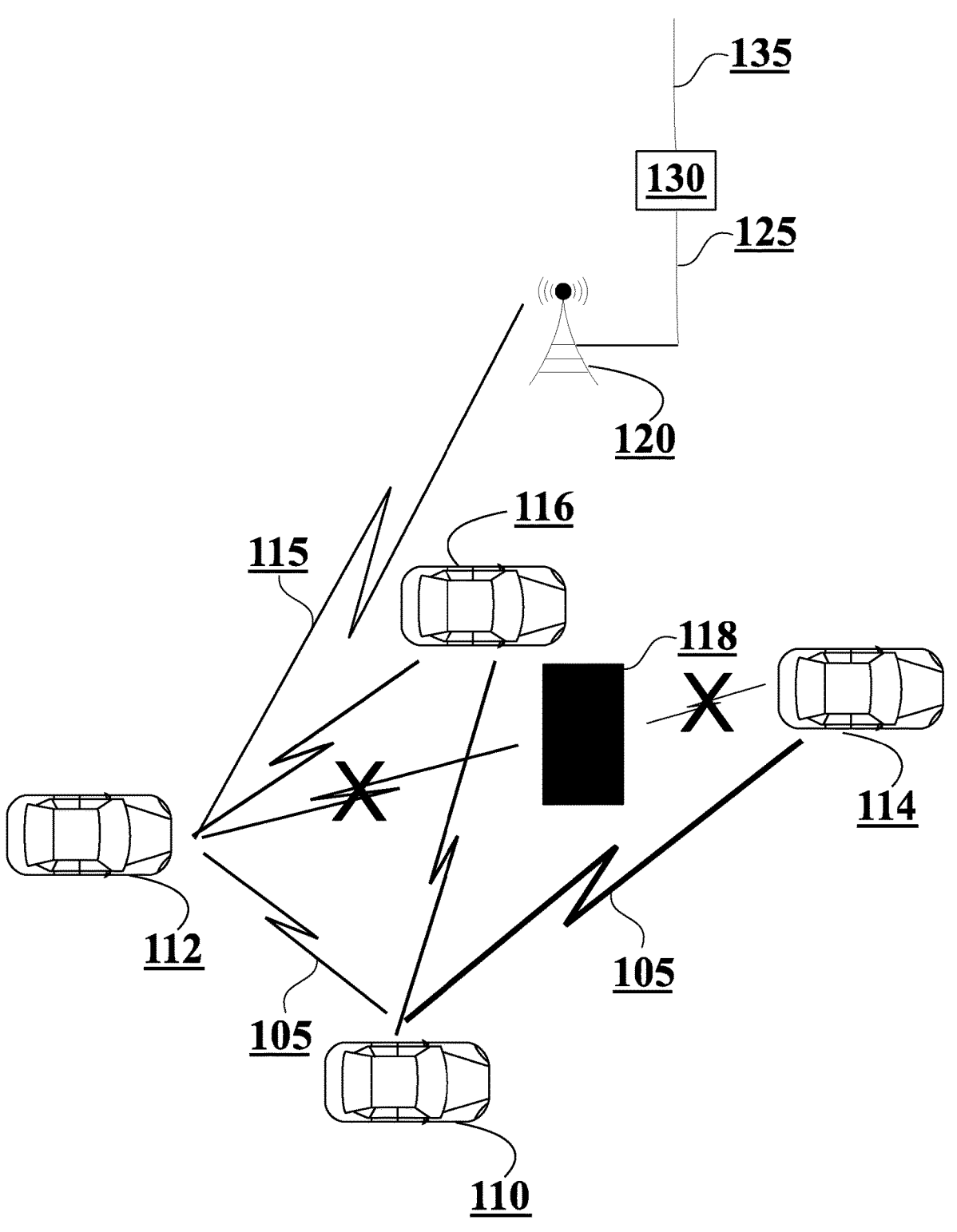
FIG. 1 illustrates an example of a communication network in accordance with at least some example embodiments.

FIG. 1 illustrates an example of a communication network in accordance with at least some example embodiments. According to the example shown in FIG. 1, there may be a wireless communication network comprising four wireless terminals. Said wireless terminals may be configured to communicate using direct Device-to-Device, D2D, communications, such as Sidelink, SL, communications. The wireless communication network of FIG. 1 comprises first wireless terminal 110, second wireless terminal 112, third wireless terminal 114 and fourth wireless terminal 116. Said wireless terminals may be for example in, or attached to, separate cars. However, embodiments of the present invention may be exploited in any suitable scenario. In some embodiments, the wireless communication network may further comprise wireless network node 120 and core network 130.

First wireless terminal 110 may be referred to as a proxy wireless terminal, which receives and possibly retransmits groupcast messages. Second wireless terminal 112 may be referred to as a source transmitter, which is an original source of said groupcast messages. Third wireless terminal 114 may receive groupcast messages from first wireless terminal 110 but not from second wireless terminal 112. Fourth wireless terminal 116 may receive groupcast messages at least from first wireless terminal 110 and second wireless terminal 120. First wireless terminal 110, third wireless terminal 114 and fourth wireless terminal 116 may be referred to as receiving, destination wireless terminals.

First wireless terminal 110 and second wireless terminal 112 may be connected to each other via air interface 105. Similarly, first wireless terminal 110 and third wireless terminal 114 may be connected to each other via air interface 105 as well but there may be no direct connection between second wireless terminal 112 and third wireless terminal 114. For instance, there may be obstacle 118 between second wireless terminal 112 and third wireless terminal 114. Obstacle 118 may be a truck for example. Third wireless terminal 114 may hence experience link blockage and cannot receive groupcast messages transmitted by second wireless terminal 112. Due to channel reciprocity, third wireless terminal 114 may not able to reach second wireless terminal 112 with feedback, such as a decodable, Hybrid Automatic Repeat reQuest, HARQ, message.

Wireless terminals 110, 112, 114 and 116 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal, like a User Equipment, UE. In some example embodiments, wireless network node 120 may be considered as a serving node for at least one wireless terminal.

Air interface 105 between wireless terminals 110, 112, 114 and 116 may be configured in accordance with a Radio Access Technology, RAT, which wireless terminals 110, 112, 114 and 116 are configured to support. Similarly, air interface 115 between for example second wireless terminal 112 and wireless network node 120 may be configured in accordance with a RAT which second wireless terminal 112 and wireless network node 120 are configured to support.

Examples of cellular RATs include Long Term Evolution, LTE, New Radio, NR, which may also be known as fifth generation, 5G, radio access technology and MulteFire. A cellular RAT may be standardized by the 3$^{rd}$ Generation Partnership Project, 3GPP, for example. Hence, wireless terminals 110, 112, 114 and 116 may be configured to operate according to the 3GPP standards. Similarly, wireless network node 120 may be configured to operate according to the 3GPP standards as well. On the other hand, examples of non-cellular RATs include Wireless Local Area Network, WLAN, and Worldwide Interoperability for Microwave Access, WiMAX.

For instance, embodiments of the present invention may be applied in LTE Vehicular-to-everything, V2X, communications. In addition, embodiments of the present invention may be applied in NR SL communications.

In case of RATs, wireless terminals may be referred to as UEs while wireless network node 120 may be referred to as a BS. In the context of LTE, wireless network node 120 may be referred to as eNB while in the context of NR, wireless network node 120 may be referred to as gNB. In the context of WLAN, wireless network node 120 may be referred to as an access point while wireless terminals may be referred to as mobile stations. In any case, example embodiments are not restricted to any particular wireless technology. Instead, example embodiments may be exploited in any wireless communication network wherein reliable groupcasting is desirable.

Wireless network node 120 may be connected, directly or via at least one intermediate node, with core network 130 via wired interface 125. Core network 130 may be, in turn, coupled via interface 135 with another network (not shown in FIG. 1), via which connectivity to further networks may be obtained, for example via a worldwide interconnection network. Wireless network node 120 may be connected, directly or via at least one intermediate node, with core network 130 or with another core network.

Embodiments of the present invention are related to using direct D2D communications, such as SL based UE-to-UE communications like V2X and NR SL, wherein wireless terminals may transmit messages to each other without communicating via wireless network node 120. A SL refers to a direct communication link between wireless terminals 110, 112 and 114 in a cellular communication network. SL communications may be performed over PC5 for example, as described for example in 3GPP TS 36.300 for LTE and 3GPP TS 38.300 for NR, based on a principle of a transmitter oriented one-to-many broadcast/groupcast communication and/or one-to-one unicast communication.

In case of groupcasting, a source transmitter, such as second wireless terminal 112, may transmit data simultaneously to multiple destination wireless terminals, such as first wireless terminal 110, third wireless terminal 114 and fourth wireless terminal 116. First wireless terminal 110, third wireless terminal 114 and fourth wireless terminal 116 may be referred to as groupcast members. In some embodiments, the source transmitter may have minimal control over said groupcast members.

Embodiments of the present invention enable reliable groupcasting by guaranteeing delivery of all groupcast retransmissions to all group members in a timely and resource-efficient manner. Reliable delivery is particularly challenging in dense, urban-area scenarios, wherein milli-metre-waves are used. At least in such scenarios groupcast members may experience blockage and/or interruption of wireless connections to the source transmitter. Also, in high mobility scenarios groupcast data delivery may fail when one or more of said receiving, destination group members move temporarily or permanently out of a coverage area of the source transmitter.

For example, in FIG. 1 obstacle 118 may be a truck which may temporarily obstruct a connection between second wireless terminal 112 and third wireless terminal 114. For example, if second wireless terminal 112 is attached to a car and third wireless terminal 114 is attached to a pedestrian, obstacle 118 in between second wireless terminal 112 and third wireless terminal 114 may create a potential safety hazard as a position of the pedestrian cannot be directly transmitted to the most relevant destination, the car. At least safety-critical vehicular applications are generally characterized by stringent expiry deadlines on groupcast data, e.g., units or tens of milliseconds, which implies the need for an efficient solution to this problem.

Groupcasting may be thus unreliable if the source transmitter, such as second wireless terminal 112, is the only source of transmitted data as well as the only recipient of feedback on reception status of a group member, such as third wireless terminal 114. In such a case, the source transmitter would be the only groupcast member that can solve data delivery problems and if its retransmissions are based on HARQ feedback for example, the only available repair mechanism could fail.

Embodiments of the present invention therefore make it possible for other groupcast members, such as first wireless terminal 110, to assist the source transmitter with delegated data delivery to peer groupcast members that have previously Negatively Acknowledged, NACK'ed, an initial transmission from the source transmitter. More specifically, the source transmitter may request other groupcast members who have positively Acknowledged, ACK'ed, the initial transmission to keep the successfully received initial groupcast transmission in their buffer and skip their own feedback, such as Physical Sidelink Feedback Channel, PSFCH, for the first retransmission. The source transmitter may also request other groupcast members to monitor the PSFCH transmission of the at least one UE that have NACKed (or DTXed) the initial transmission and perform a groupcast retransmission on behalf of the original source transmitter. In some embodiments, DTX may mean that the intended groupcast receiving wireless terminal is configured to provide feedback, but the source transmitting wireless terminal does not get any feedback (neither ACK nor NACK) from the receiving wireless terminal. That is, DTX may mean the absence of any feedback if the receiving wireless terminal(s) are configured to provide feedback.

That is to say, groupcast members who successfully received a given groupcast message, such as first wireless terminal 110, may keep a copy of data of the successfully received groupcast message in their memory, e.g., in the MAC buffer, but not send feedback, such as HARQ feedback, in case said data needs to be retransmitted to group members that have previously NACK'ed the message in question. Instead, said groupcast members who have successfully received a given groupcast message may monitor, similarly as the source transmitter, for the feedback associated with the retransmission of other peer group members.

Said groupcast members who have successfully received a given groupcast message may provide derived feedback of the retransmission(s) to the source transmitter of the groupcast message to allow the source transmitter to exploit the acquired monitoring information to identify which of the successful groupcast receivers may act as a proxy groupcast transmitter, i.e., efficient alternative retransmitter(s). Said derived feedback may be related to said monitoring, e.g., be associated with reception of the retransmission at another member. Said derived feedback may be the same as feedback received from said another member, but it may be different as well and comprise for example additional metadata.

The source transmitter may select at least one other wireless terminal and request the at least one other wireless terminal to act as a proxy, to perform retransmissions on behalf of the source transmitter. Hence, timely and reliable delivery of groupcast data to all groupcast members can be ensured, including groupcast receivers which are out of a coverage area of the source transmitter.

With reference to FIG. 1 again, second wireless terminal 112 may identify and request first wireless terminal 110 to act as a proxy transmitter. In some embodiments, first wireless terminal 110 may either perform the delegated retransmission(s) on behalf of second wireless terminal 112, i.e., second wireless terminal 112 would not be sending additional retransmissions in such a case. Alternatively, first wireless terminal 110 may supplement retransmissions of second wireless terminal 112, i.e., first wireless terminal 110 and second wireless terminal 112 may send retransmission(s) simultaneously to help delivery of the groupcast message to third wireless terminal 114, if third wireless terminal is suffering from interruption of direct connection to second wireless terminal 112 due to blockage caused by obstacle 118.

Embodiments of the present invention may be exploited in various implementations, such as centralized, distributed, complementary, stand/alone, etc. It should be noted that zoning or range information, which may be available within SL groupcast sessions, may be too ambiguous for an efficient determination of who could become a suitable proxy for a particular groupcast member. For example, the source transmitter may not be able to use Reference Signal Receive Power, RSRP, measurements of HARQ feedback to determine how individual groupcast members are mutually interconnected with out-of-coverage UEs.

Figure 2:
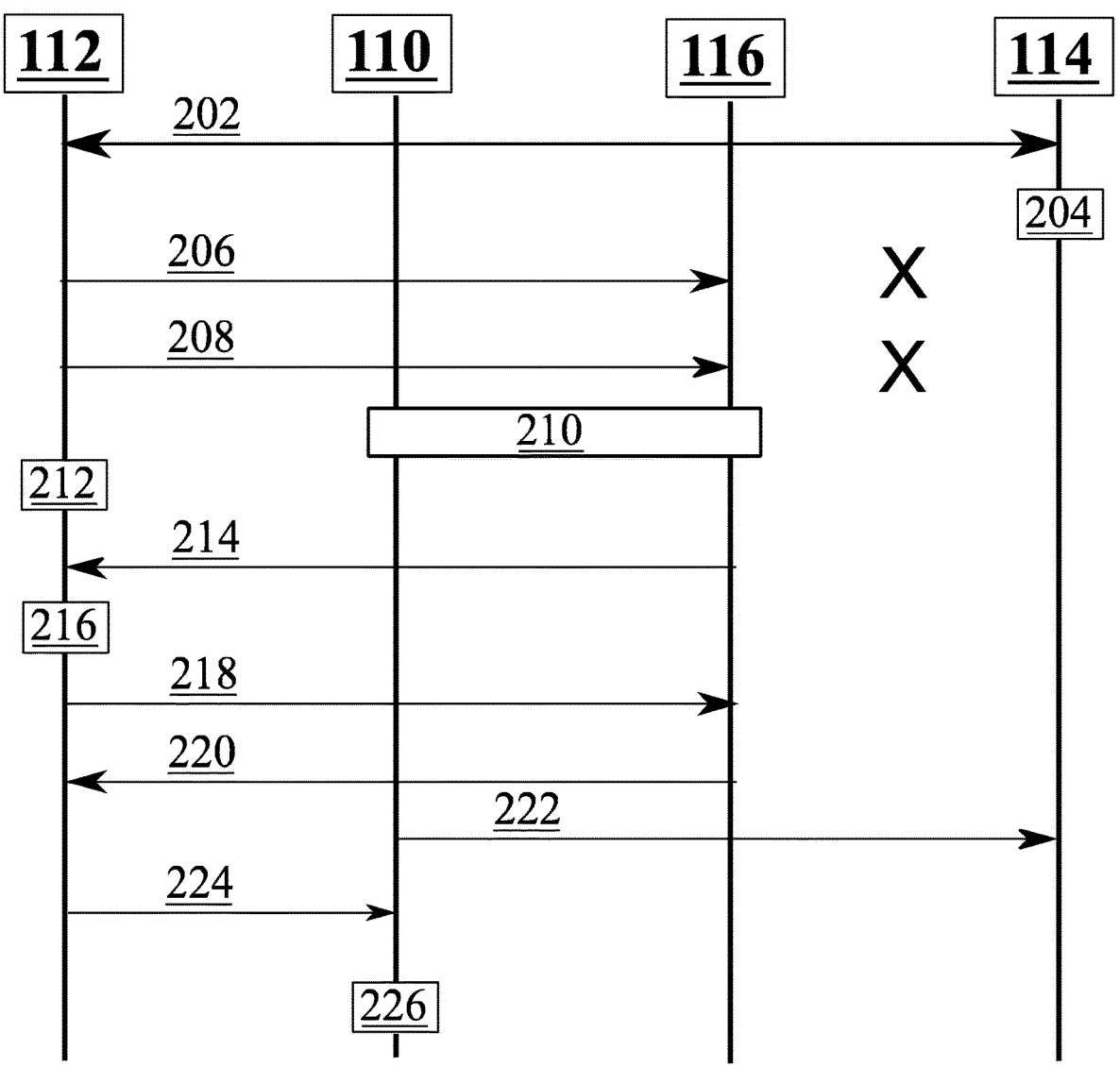
FIG. 2 illustrates a signalling graph in accordance with at least some example embodiments.

FIG. 2 illustrates a signalling graph in accordance with at least some example embodiments. With reference to FIG. 1, on the vertical axes are disposed, from the left to the right, second wireless terminal 112, first wireless terminal 110, fourth wireless terminal 116 and third wireless terminal 114. Time advances from the top towards the bottom.

At step 202, second wireless terminal 112 may transmit a groupcast message to receiving members of a group of wireless terminals, the group comprising first wireless terminal 110, third wireless terminal 114 and fourth wireless terminal 116. In some embodiments, proactive retransmissions may be pre-configured. The groupcast message may be transmitted under the requirement of reliable data delivery to all of said groupcast members. For instance, the requirement of reliable data delivery may be due to configuration of pre-defined logical channel priority level, PC5 Quality of Service, QoS, delay budget and/or maximum number of transmissions. Said receiving members of the group may be configured to provide feedback, such as HARQ feedback, to second wireless terminal 112. At step 202, all of said receiving members of the group may acknowledge reception of the groupcast message as well.

At step 204, third wireless terminal 114 may suffer from blockage. For instance, obstacle 118 may have moved so that it is now in between second wireless terminal 112 and third wireless terminal 114.

At step 206, second wireless terminal 112 may transmit another groupcast message to all wireless terminals. As third wireless terminal 114 suffers from blockage, it may not receive said another groupcast message. First wireless terminal 110 and fourth wireless terminal 116 may acknowledge reception of said another groupcast message but third wireless terminal 114 cannot acknowledge the reception due to the blockage. First wireless terminal 110 and fourth wireless terminal 116 may also forward data of the successfully received message to higher layers of the protocol stack but keep copies of said data in their memories for some time, e.g., until a keeping timer elapses or second wireless terminal 112 transmits a new groupcast transmission.

At step 208, second wireless terminal 112 may transmit a first retransmission of said another groupcast message, because it did not receive an ACK from third wireless terminal 114 or did not receive any feedback at all from third wireless terminal. The first retransmission may comprise, or be transmitted along with, an indication for feedback channel monitoring, such as PSFCH monitoring.

At step 210, proxy candidates, such as first wireless terminal 110 and fourth wireless terminal 116, may monitor a feedback channel, like PSFCH, associated with the first retransmission of second wireless terminal 112. If second wireless terminal 112 retransmits said another groupcast message upon detecting NACK or Discontinuous Transmission, DTX, feedback reception from at least one receiving wireless terminal of the group, wireless terminals that have already successfully received the initial groupcast message may monitor the feedback channel associated with the retransmission(s), i.e., do not send their own HARQ feedback on the same data anymore. That is, for example first wireless terminal 110 and fourth wireless terminal 116 may monitor the feedback channel associated with the retransmission. In some embodiments, PSFCH monitoring may start after a configurable number of counted retransmissions "Num_ReTX_entering_PSFCH_monitoring", to determine the data reception status of peer groupcast UEs from their HARQ feedback.

In some embodiments, second wireless terminal 112 may control which receiving wireless terminals engage in the proposed retransmission scheme, e.g., to exclude incompatible wireless terminals. Wireless terminals eligible for monitoring may be determined/announced for example during a setup of a groupcast session. A flag may be used to signal that all wireless terminals must, or must not, engage in said monitoring. The flag may be an explicit command contained in a Sidelink Control Information, SCI, or a Medium Access Control, MAC, Control Element, CE.

At step 212, second wireless terminal 112 may ignore a missing positive acknowledgement concerning successful reception of the first retransmission of the groupcast transmission at first wireless terminal 110. That is, second wireless terminal 112 may disregard the missing positive acknowledgement, i.e., not to pay attention to the fact that it has not received any positive acknowledgement from first wireless terminal 110. In some embodiments, the source transmitting wireless terminal may ignore a missing HARQ feedback for the retransmission(s) from those receiving terminals which have acknowledged already the initial transmission and now perform feedback channel monitoring. Second wireless terminal 112 may be aware that first wireless terminal 110 will not provide the positive acknowledgement because first wireless terminal 110 has already acknowledged the initial transmission.

For instance, first wireless terminal 110 may refrain from acknowledging successful reception of the first retransmission of said another groupcast message to second wireless terminal 112 and skip a transmission of feedback related to reception of the first retransmission at first wireless terminal 112, because it has already ACK'ed the initial transmission.

At step 214, first wireless terminal 110 may transmit, upon receiving the first retransmission of the groupcast message, derived feedback, such as unsolicited feedback related to said monitoring. Said derived feedback may be related to reception of the first retransmission at third wireless terminal 114, and transmitted to second wireless terminal 112 by first wireless terminal 110. First wireless terminal 110 may transmit to second wireless terminal 112, e.g., unsolicited HARQ feedback associated with said ongoing retransmission(s). The unsolicited HARQ feedback may comprise an identity of first wireless terminal 110 (UE_ID), an identity of the first retransmission (re-TX_data_ID), RSRP of the first retransmission (RSRP_TX) and/or RSRP of the feedback channel (RSRP_PSFCH_RX_UE). The unsolicited HARQ feedback may be conditioned and/or delayed by a timer, such as expiry of a resolve timer which may be started when a first NACK is detected, no ACK is provided by affected third wireless terminal 114, maximum number of retransmissions by second wireless terminal 112 is reached and/or less than N NACK reports from other transmitting peer wireless terminals, such as fourth wireless terminal 116, is detected (if detectable).

The unsolicited feedback may concern wireless terminals that have NACKed the transmitted initial groupcast from second wireless terminal 112. Alternatively, or in addition, the unsolicited feedback may be delivered to second wireless terminal 112 by said wireless terminals that have ACKed the transmitted initial groupcast message. For instance, third wireless terminal 114 may be consistently in NACK state due to systemic link failure, have transitioned from ACK to NACK state (e.g., ACK may get lost), be a previously active wireless terminal which cannot be detected anymore (update on inter-connections relationships) and/or be a newly active wireless terminal which could not be observed previously (update on inter-connections relationships).

The unsolicited feedback may be transmitted using a dedicated stand-alone transmission to second wireless terminal 112, e.g., over parallel unicast, Random Access Channel, RACH, -based small data transmission, and/or appending the unsolicited feedback using code-division multiplex) to its own HARQ feedback in one of the subsequent PSFCH occasions associated with that groupcast transmission.

At step 216, second wireless terminal 112 may determine a proxy wireless terminal, such as first wireless terminal 110. Second wireless terminal 112 may use the unsolicited feedback provided by monitoring wireless terminals, such as first wireless terminal 110 and fourth wireless terminal 116, to modify the configuration of groupcast transmission and/or retransmissions. For instance, NACK-triggered retransmissions caused by a receiving wireless terminal may be stopped if the unsolicited feedback indicated an ACK by the same receiving wireless terminal, the number of retransmissions may be increased if multiple receiving wireless terminals in bad radio conditions are reported, the retransmission coding & modulation scheme may be adapted, for example lower constellation and/or lower coding may be chosen to improve Signal-to-Interference and Noise Ratio, SINR, margin if poor connectivity persists, and vice versa.

At step 218, second wireless terminal 112 may transmit a groupcast retransmission delegation request, wherein the groupcast retransmission delegation request is a request for retransmitting said data, as complementary to, or instead of, its own retransmission whenever second wireless terminal 112 fails to successfully deliver data to third wireless terminal 114. Unsuccessful reception may be indicated by a NACK or determined if no expected HARQ feedback is received from third wireless terminal 114. Unsuccessful reception may be indicated by a report on an overheard NACK event, which first wireless terminal 110 may, or may not, have received directly itself, or alternatively from another groupcast member which already ACKed the same data.

The groupcast retransmission delegation request may be transmitted to at least one proxy wireless terminal, such as first wireless terminal 110 which has reported, e.g., unsolicited HARQ indicating good signal strength to third wireless terminal 114, which has NACKed the initial transmission. Alternatively, the groupcast retransmission delegation request may be transmitted to a randomly selected receiving wireless terminal. For instance, there may be receiving wireless terminals which may have recently transitioned to ACK-state but their unsolicited feedback has not been transmitted yet, e.g., because of no or only very recent monitoring opportunity, transmitter configured reporting delay or restriction.

The groupcast retransmission delegation request may be signalled via a GroupcastDelegationRequest message comprising retransmission parameters and an identity of at least one of first wireless terminal 110 and third wireless terminal 114, which has NACKed the initial groupcast transmission, or an SCI grant transmitted by second wireless terminal 112. The retransmission parameters may indicate for example the timing and format to be used for retransmission by first wireless terminal 110. The delegation may occur independently of whether the unsolicited feedback, such as HARQ feedback, was received from a selected wireless terminal. Delegated activity may be constrained by a timer, such as a delegationValidityTimer of pre-configured duration.

When deciding to accept or reject the groupcast retransmission delegation request, first wireless terminal 110 may consider availability of data to be retransmitted (e.g., reject if no copy of data is available due to failed reception or copy deletion), connectivity to third wireless terminal 114 (e.g., accept if unicast connection to third wireless terminal 114 is already established, reject if connectivity to third wireless terminal 114 is unknown or insufficient as derived from zoning or HARQ monitoring). It should also be noted that unknown RSRP to third wireless terminal 114 may be harmless if first wireless terminal 110 only recently ACKed the initial data transmission and did not have opportunity to monitor HARQ.

Alternatively, or in addition, when deciding to accept or reject the groupcast retransmission delegation request, first wireless terminal 110 may consider own activity cycle (e.g., if first wireless terminal 110 plans to undergo SL Discontinuous Reception, DRX, inactive period), other information related to delegation validity (e.g., minimum residual value of the delegationValidityTimer) and provide feedback on relevant decision-making inputs to second wireless terminal 110 (e.g., the observed HARQ status may be provided when third wireless terminal 114 was observed to ACK past retransmissions of second wireless terminal 112 (e.g., with a spoofed L2 ID or not) to assist first wireless terminal 110 with the termination of its own re-transmissions, the measured RSRP of the observed HARQ is provided if there exist other wireless terminals with good and/or better coverage to third wireless terminal 114 to assist second wireless terminal 112 with the selection of the complementary/replacement proxy wireless terminal.

At step, 220 a response of first wireless terminal 110 to the groupcast retransmission delegation request may be signalled via a dedicated groupcast delegation accept message if first wireless terminal 110 accepts the delegation request or via a dedicated groupcast reject message if first wireless terminal 110 cannot execute the delegation request or NACKs to the SCI grant by second wireless terminal 112.

At step 222, first wireless terminal 110 may transmit a second retransmission of the groupcast message to third wireless terminal 114. In some embodiments, second wireless terminal 112 may transmit an indication to first wireless terminal 110, wherein the indication indicates a fully transparent mode. The fully transparent mode may be a mode wherein an identity of second wireless terminal 112 should be used by first wireless terminal 110 in the second retransmission of the initial groupcast message. That is, in the fully transparent mode, first wireless terminal 110 may replace its own source identity with a source identity of second wireless terminal 112 to mimic, or spoof, the groupcast transmissions of second wireless terminal 112. In such a case, other group members would not be aware of the retransmission delegation and the retransmission(s) performed by first wireless terminal 110 on behalf of second wireless terminal 112.

Second wireless terminal 112 may not provide feedback related to delegated retransmission(s) of first wireless terminal 110. Instead, second wireless terminal 112 may monitor the associated feedback channel, such as PSFCH resources, in addition to first wireless terminal 110. Similarly, first wireless terminal 110 may monitor the feedback associated with any potential retransmission of second wireless terminal 112.

The delegated retransmission task may be terminated by both, first wireless terminal 110 and second wireless terminal 112, when an ACK is received from third wireless terminal 114, maximum number of retransmission is reached, data timer expired (e.g., delegationValidityTimer) and/or explicit command from second wireless terminal 112 (applies only to first wireless terminal 110) if indicated by higher layers. First wireless terminal 110 may be configured to provide explicit feedback on the task outcome to second wireless terminal 112, such as (N)ACK received, counter exceeded, etc. Second wireless terminal 112 may use implicit feedback to first wireless terminal 110 to terminate the task (e.g., a new data transmission may be indicated).

In some embodiments, a wireless terminal does not need to report its own termination status if a termination notice is received from another wireless terminal. Second wireless terminal 112 may adopt the same criteria to terminate the task.

In some embodiments, second wireless terminal 112 may report unreachable receiving wireless terminals to higher layers (e.g., after N data transmissions are marked as failed). Vice versa, upper layers may report on groupcast exit and stop retransmissions of second wireless terminal 112.

At step 224, second wireless terminal 112 may monitor feedback. At step 226, first wireless terminal 110 may stop delegated groupcast retransmission(s).

In the example shown in FIG. 2, the initial groupcast message may be retransmitted by first wireless terminal 110 only when the retransmission task is explicitly delegated by second wireless terminal 112 to first wireless terminal 110. Second wireless terminal 112 may delegate the same retransmission event(s) (e.g., associated with delivering lost data to third wireless terminal 114) to one or more groupcast receiving wireless terminals (once-off assignment, semi-persistent/persistent schemes) while using any arbitrary multiplexing in time (random, sequential, alternating).

The retransmissions of first wireless terminal 110 and second wireless terminal 112 may be performed in orthogonal (i.e., non-overlapping) time-frequency resources. Alternatively, the retransmissions of first wireless terminal 110 and second wireless terminal 112 may be performed simultaneously in the same resources as indicated, e.g., by the SCI grant of second wireless terminal 112. Second wireless terminal 112 may indicate a redundancy version and other relevant transport block parameters that allow first wireless terminal 110 to apply an identical transmission format. This ensures that both retransmissions, of first wireless terminal 110 and second wireless terminal 112, add constructively add at a receiver (if both are received within the cyclic prefix duration).

In general, a contribution of second wireless terminal 112 to retransmission on shared resources may be expected to be small due to its poor signal strength at the affected receiver but resource sharing may be considered more resource efficient, especially when a large number of transmitting proxy wireless terminals are active.

In some embodiments, a fully autonomous retransmission by first wireless terminal 110 may be achieved without any explicit signalling by second wireless terminal 112. Transmitting proxy wireless terminals, such as first wireless terminal 110 and fourth wireless terminal 116, may deem themselves as suitably reaching other wireless terminals in poor coverage conditions compared to second wireless terminal 112 autonomously and without any unnecessary delay engage in a retransmission on behalf of second wireless terminal 112. In such a case, second wireless terminal 112 may not be aware that it is supported by an autonomous transmitting proxy wireless terminal, but reliability is further enhanced as there is no need separately request retransmissions.

The transmitting proxy wireless terminal may engage either in a stand-alone transmission on orthogonal resources or a transparent retransmission on shared resources. For retransmission in shared resources, there may be a convention around how, e.g., redundancy versions are selected so that each transmitting proxy wireless terminal may choose the right format of a retransmission without resorting to explicit signalling with second wireless terminal 112.

Suitable candidate proxies may engage in autonomous data retransmissions based on a prior configuration by second wireless terminal 112, or at least with a subsequent report to it. For example, second wireless terminal 112 may pre-configure that certain range of signal strength to both, second wireless terminal 112 and affected third wireless terminal 114, may trigger a retransmission event. This may be an efficient strategy in particular in linear topologies such as in platooning where often also the position of second wireless terminal 112 with respect to other receiving wireless terminals may be known.

Figure 3:
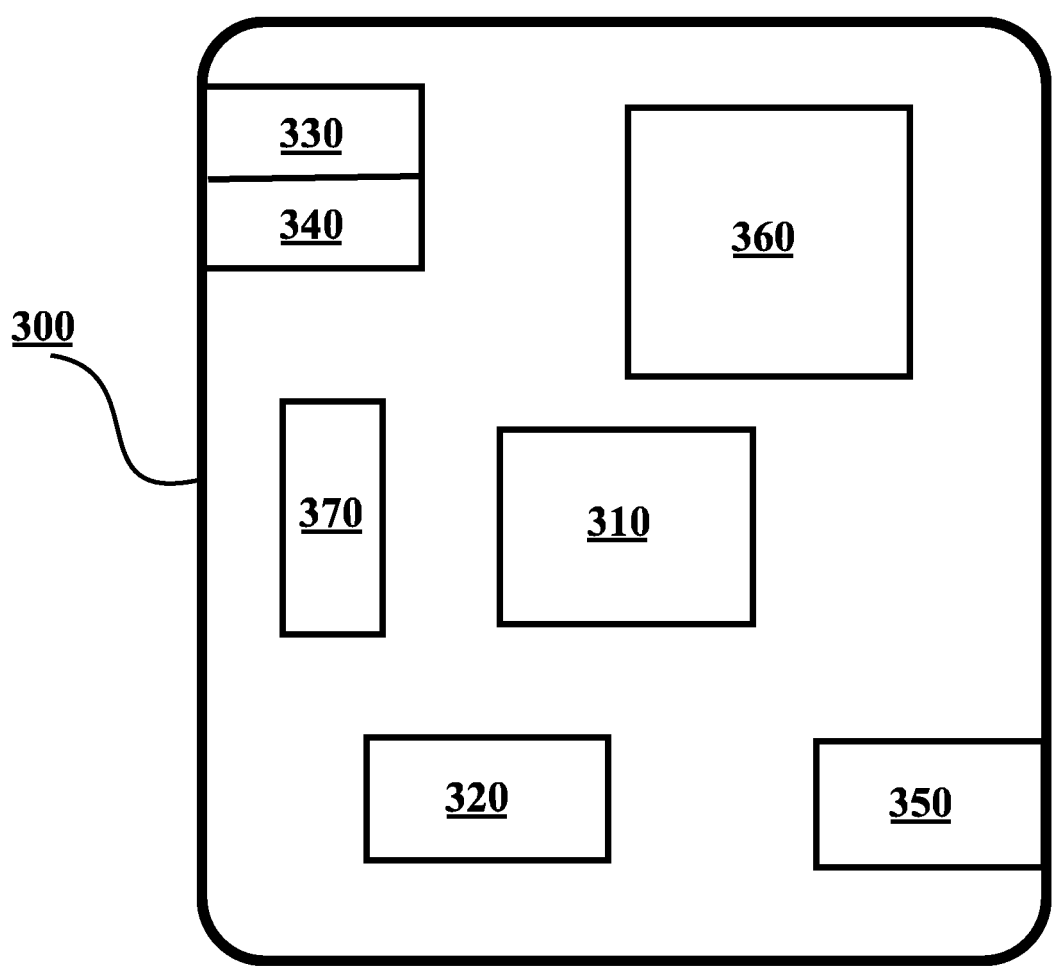
FIG. 3 illustrates an example apparatus capable of supporting at least some example embodiments.

FIG. 3 illustrates an example apparatus capable of supporting at least some example embodiments. Illustrated is device 300, which may comprise, for example, first wireless terminal 110 or second wireless terminal 112, or a device controlling functioning thereof, possibly when installed therein. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. Processor 310 may comprise at least one Application-Specific Integrated Circuit, ASIC. Processor 310 may comprise at least one Field-Programmable Gate Array, FPGA. Processor 310 may comprise at least one Qualcomm Snapdragon and/or Intel Atom processor. Processor 310 may comprise, for example, a Cortex-A8 processing core manufactured by ARM Holdings or a Steamroller processing core produced by Advanced Micro Devices Corporation. Processor 310 may be means for performing method steps in device 300, such as determining, causing transmitting and causing receiving. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, Long Term Evolution, LTE, and/or 5G/NR standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the embodiments.

FIG. 4 is a flow graph of a first method in accordance with at least some example embodiments. The phases of the illustrated first method may be performed by first wireless terminal 110 or a device controlling functioning thereof, possibly when installed therein.

The first method may comprise, at step 410, receiving, by a first wireless terminal, a first retransmission of a groupcast message successfully from a second wireless terminal. The first method may also comprise, at step 420, skipping, by the first wireless terminal, a transmission of feedback related to reception of the first retransmission at the first wireless terminal. Moreover, the first method may comprise, at step 430, monitoring, by the first wireless terminal, feedback from a third wireless terminal, wherein said feedback is related to reception of the first retransmission at the third wireless terminal. Finally, the first method may comprise, at step 440, transmitting, by the first wireless terminal, derived feedback related to reception of the first retransmission at the third wireless terminal to the second wireless terminal.

FIG. 5 is a flow graph of a second method in accordance with at least some example embodiments. The phases of the illustrated second method may be performed by second wireless terminal 112 or a device controlling functioning thereof, possibly when installed therein.

The second method may comprise, at step 510, transmitting, by a second wireless terminal, a first retransmission of a groupcast message at least to a first wireless terminal and a third wireless terminal. The second method may also comprise, at step 520, disregarding by the second wireless terminal, a missing positive acknowledgement concerning successful reception of the first retransmission at the first wireless terminal. Finally, the second method may comprise, at step 530, receiving, by the second wireless terminal, derived feedback from the first wireless terminal, wherein said derived feedback is related to reception of the first retransmission at the third wireless terminal.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, comprising for example first wireless terminal 110 or second wireless terminal 112, may further comprise means for carrying out the example embodiments described above and any combination thereof. The apparatus may be an apparatus of a cellular communication network, such as a 5G network, and comprise means for operating in the cellular communication network.

In an example embodiment, a computer program comprising instructions which, when the program is executed by a computer, cause the computer to carry out a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, comprising for example first wireless terminal 110 or second wireless terminal 112, may further comprise at least one processor, and at least one memory including computer program code, wherein the at least one memory and the computer program code are configured to, with the at least one processor, cause the apparatus at least to perform the example embodiments described above and any combination thereof. The apparatus may be an apparatus of a cellular communication network, such as a 5G network, and configured to operate in the cellular communication network.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

INDUSTRIAL APPLICABILITY

At least some example embodiments find industrial application in wireless communication networks, such as in cellular communication networks, like 5G networks, and possibly in other wireless communication networks, like WLAN, as well.

ACRONYMS LIST

3GPP 3rd Generation Partnership Project
ACK positive Acknowledgement
BS Base Station
CE Control Element
D2D Device-to-Device
DRX Discontinuous Reception
DTX Discontinuous Transmission
GSM Global System for Mobile communication
HARQ Hybrid Automatic Repeat reQuest
IoT Internet of Things
LTE Long-Term Evolution
M2M Machine-to-Machine
MAC Medium Access Control
NACK Negative Acknowledgement
NFC Near-Field Communication
NR New Radio
PSFCH Physical Sidelink Feedback Channel
RACH Random Access Channel
RAT Radio Access Technology
RRC Radio Resource Control
RSRP Reference Signal Receive Power
QoS Quality of Service SCI Sidelink Control Information
SINR Signal-to-Interference and Noise Ratio
SL Sidelink
UE User Equipment
UI User Interface
V2X Vehicular-to-everything
WCDMA Wideband Code Division Multiple Access
WiMAX Worldwide Interoperability for Microwave Access
WLAN Wireless Local Area Network

| REFERENCE SIGNS LIST | |
| --- | --- |
| 105, 115 | Air interfaces |
| 110, 112, 114, 116 | Wireless terminals |
| 118 | Obstacle |
| 120 | Wireless network node |
| 125, 135 | Wired interfaces |
| 130 | Core network |
| 202-226 | Steps in FIG. 2 |
| 300-370 | Structure of the apparatus of FIG. 3 |
| 410-440 | Phases of the method in FIG. 4 |
| 510-530 | Phases of the method in FIG. 5 |

What is claimed is:

1. A first wireless terminal, comprising:
at least one processor;
at least one memory including computer program code,
the at least one memory and the computer program code being configured, with the at least one processor, to cause the first wireless terminal at least to:
receive a groupcast message from a second wireless terminal;
acknowledge the receipt of the groupcast message;
receive, a first retransmission of the groupcast message from the second wireless terminal;
skip, a transmission of a first feedback related to reception of the first retransmission at the first wireless terminal, wherein skipping the transmission of the first feedback comprises refraining from acknowledging successful reception of the first retransmission of the groupcast message based on the acknowledgement of the groupcast message;
monitor, a second feedback from a third wireless terminal, wherein the second feedback is related to reception of the first retransmission at the third wireless terminal, and wherein the monitoring starts after a predetermined number of counted retransmissions of the groupcast message;
based on monitoring, determine that the third wireless terminal did not successfully receive the first retransmission of the groupcast message;
based on the determination that the third wireless terminal did not successfully receive the first retransmission of the groupcast message, generate a derived feedback to the second wireless terminal;
transmit the derived feedback to the second terminal, wherein the derived feedback is related to reception of the first retransmission at the third wireless terminal, and wherein the derived feedback comprises:
an identity of the first wireless terminal,
an identity of the first retransmission,
a Reference Signal Receive Power (RSRP) of the first retransmission, and
a RSRP of a feedback channel associated with the third wireless terminal;
receive a groupcast retransmission delegation request from the second wireless terminal to retransmit the groupcast message, wherein the groupcast retransmission delegation request comprises a timer and a redundancy version parameter, wherein the redundancy version parameter defines a transport block parameter for applying a transmission format identical to the first retransmission;

store data of the groupcast message in the at least one memory until the timer expires; and in response to receiving the groupcast retransmission delegation request, simultaneously retransmit, with the second wireless terminal, the groupcast message to the third wireless terminal as a second retransmission, wherein the second retransmission utilizes a transmission format based on the redundancy version parameter.

2. The first wireless terminal of claim 1, wherein monitoring the second feedback from the third wireless terminal comprises detecting at least one of a negative acknowledgement (NACK) or a discontinuous transmission (DTX) associated with the first retransmission.

3. The first wireless terminal of claim 2, wherein the second feedback is transmitted on a Physical Sidelink Feedback Channel (PSFCH) associated with the first retransmission.

4. The first wireless terminal of claim 3, wherein storing the data of the groupcast message comprises storing the data in a Medium Access Control (MAC) buffer of the first wireless terminal until expiration of the timer included in the groupcast retransmission delegation request.

5. The first wireless terminal of claim 4, wherein retransmitting the groupcast message as the second retransmission is performed only after determining that the first wireless terminal has an available copy of the groupcast message and a valid sidelink connection to the third wireless terminal.

6. The first wireless terminal of claim 5, wherein the second retransmission by the first wireless terminal and a retransmission by the second wireless terminal are transmitted in shared time-frequency resources using the identical transmission format defined by the redundancy version parameter, such that the retransmissions constructively combine at the third wireless terminal.

7. The first wireless terminal of claim 6, wherein retransmitting the groupcast message as the second retransmission comprises transmitting the second retransmission using a source identity of the second wireless terminal instead of a source identity of the first wireless terminal.

8. A method comprising:

receiving, by a first wireless terminal, a groupcast message from a second wireless terminal;

acknowledging, by the first wireless terminal, the receipt of the groupcast message;

receiving, by the first wireless terminal, a first retransmission of the groupcast message from the second wireless terminal;

skipping, by the first wireless terminal, a transmission of a first feedback related to reception of the first retransmission at the first wireless terminal, wherein the skipping comprises refraining from acknowledging successful reception of the first retransmission of the groupcast message based on the acknowledgement of the groupcast message;

monitoring, by the first wireless terminal, a second feedback from a third wireless terminal, wherein the second feedback is related to reception of the first retransmission at the third wireless terminal and wherein the monitoring starts after a predetermined number of counted retransmissions of the groupcast message;

based on the monitoring, by the first wireless terminal, determine that the third wireless terminal did not successfully receive the first retransmission of the groupcast message;

based on the determination, by the first wireless terminal, generate a derived feedback to the second wireless terminal;

transmitting, by the first wireless terminal, the derived feedback to the second wireless terminal, wherein the derived feedback is related to reception of the first retransmission at the third wireless terminal and wherein the derived feedback comprises:
an identity of the first wireless terminal,
an identity of the first retransmission,
a Reference Signal Receive Power (RSRP) of the first retransmission, and
a RSRP of a feedback channel associated with the third wireless terminal;

receiving, by the first wireless terminal, a groupcast retransmission delegation request from the second wireless terminal to retransmit the groupcast message, wherein the groupcast retransmission delegation request comprises a timer and a redundancy version parameter, and wherein the redundancy version parameter specifies a transport block parameter for a applying a transmission format of the first retransmission;

storing data of the groupcast message in a memory of the first wireless terminal until the timer expires; and in response to receiving the groupcast retransmission delegation request, simultaneously retransmitting, with the second wireless terminal, the groupcast message to the third wireless terminal as a second retransmission, wherein the second retransmission utilizes the transmission format based on the redundancy version parameter.

\* \* \* \* \*